United States Patent
Shin et al.

(10) Patent No.: US 9,336,114 B2
(45) Date of Patent: May 10, 2016

(54) APPARATUS AND METHOD FOR DETECTING ERROR

(71) Applicant: Samsung Electronics Co., Ltd., Suwon-si (KR)

(72) Inventors: Young Sam Shin, Hwaseong-si (KR); Seung Won Lee, Hwaseong-si (KR); Shi Hwa Lee, Seoul (KR); Min Young Son, Hwaseong-si (KR); Jae Don Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 13/890,675

(22) Filed: May 9, 2013

(65) Prior Publication Data

US 2014/0032976 A1   Jan. 30, 2014

(30) Foreign Application Priority Data

Jul. 24, 2012   (KR) .......................... 10-2012-0080405

(51) Int. Cl.
　　*G06F 11/00*　　(2006.01)
　　*G06F 11/34*　　(2006.01)
　　*G06F 11/07*　　(2006.01)

(52) U.S. Cl.
　　CPC ........ *G06F 11/3409* (2013.01); *G06F 11/0721* (2013.01); *G06F 11/0763* (2013.01)

(58) Field of Classification Search
　　CPC . G06F 11/3466; G06F 11/3648; H01R 11/07; H01R 13/187; H01R 4/60
　　USPC ........ 714/11, 47; 717/128, 131; 718/102, 108
　　See application file for complete search history.

(56) References Cited

U.S. PATENT DOCUMENTS

| 5,568,407 | A | * | 10/1996 | Hass ................... G06F 17/5022 324/73.1 |
| 5,581,697 | A | | 12/1996 | Gramlich et al. |
| 5,961,650 | A | | 10/1999 | Arendt et al. |
| 6,076,157 | A | * | 6/2000 | Borkenhagen ........ G06F 9/4825 712/228 |
| 6,176,535 | B1 | | 1/2001 | Chaloult et al. |

(Continued)

FOREIGN PATENT DOCUMENTS

| JP | 6-175884 | 6/1994 |
| JP | 2000-29738 | 1/2000 |

(Continued)

OTHER PUBLICATIONS

Lee, "The problem with threads", Jan. 10, 2006, University of California at Berkeley, p. 1-19.*

(Continued)

*Primary Examiner* — Bryce Bonzo
*Assistant Examiner* — Jeison C Arcos
(74) *Attorney, Agent, or Firm* — NSIP Law

(57) ABSTRACT

An apparatus and method for detecting an error occurring when an application program is executed in a computer environment is provided. The error detection apparatus may measure a deterministic progress index (DPI) and a program counter (PC) value when an instruction is executed, set, as a verification set, a DPI and a PC value measured when the instruction is executed without causing an error, set, as a measurement set, the DPI and the PC value measured when an instruction is executed, and detect a runtime error of the instruction by comparing the measurement set to the verification set.

21 Claims, 16 Drawing Sheets

(56) References Cited

U.S. PATENT DOCUMENTS

| | | | | |
|---|---|---|---|---|
| 6,247,143 | B1* | 6/2001 | Williams | G06F 9/52 714/11 |
| 6,499,048 | B1* | 12/2002 | Williams | G06F 9/52 718/102 |
| 7,409,596 | B2 | 8/2008 | Barsness et al. | |
| 7,475,387 | B2* | 1/2009 | Chandane | G06F 11/3612 714/38.1 |
| 7,634,690 | B2 | 12/2009 | Barsness et al. | |
| 8,122,280 | B2 | 2/2012 | Ngan et al. | |
| 2001/0037492 | A1* | 11/2001 | Holzmann | G06F 11/3608 717/128 |
| 2002/0129306 | A1* | 9/2002 | Flanagan | G06F 9/524 714/100 |
| 2003/0023656 | A1* | 1/2003 | Hutchison | G06F 9/524 718/100 |
| 2003/0131283 | A1* | 7/2003 | Ur | G06F 11/3672 714/36 |
| 2003/0233394 | A1* | 12/2003 | Rudd | G06F 9/3851 718/107 |
| 2004/0030838 | A1* | 2/2004 | van de Waerdt | G06F 12/0864 711/137 |
| 2004/0068501 | A1* | 4/2004 | McGoveran | G06F 11/1474 |
| 2006/0150163 | A1* | 7/2006 | Chandane | G06F 11/3612 717/131 |
| 2007/0177184 | A1 | 8/2007 | Boston et al. | |
| 2008/0104610 | A1* | 5/2008 | Norton | G06F 11/3419 718/108 |
| 2009/0119549 | A1* | 5/2009 | Vertes | G06F 11/3414 714/47.1 |
| 2009/0193298 | A1 | 7/2009 | Mukherjee | |
| 2012/0005679 | A1* | 1/2012 | Shin | G06F 11/3466 718/100 |
| 2012/0023505 | A1* | 1/2012 | Shin | G06F 9/4881 718/108 |
| 2012/0151184 | A1* | 6/2012 | Wilkerson | G06F 8/43 712/36 |
| 2013/0061097 | A1* | 3/2013 | Mendel | G06F 11/0757 714/47.1 |
| 2014/0201718 | A1* | 7/2014 | Bates | G06F 11/3632 717/129 |
| 2014/0283040 | A1* | 9/2014 | Wilkerson | G06F 21/52 726/22 |

FOREIGN PATENT DOCUMENTS

| | | |
|---|---|---|
| JP | 2000-112772 | 4/2000 |
| JP | 2001-350508 | 12/2001 |
| JP | 2004-21429 | 1/2004 |
| JP | 2005-332030 | 12/2005 |
| JP | 2009-193335 | 8/2009 |
| KR | 10-2008-0009923 | 1/2008 |
| KR | 10-2008-0087871 | 10/2008 |
| KR | 10-2010-0108816 | 10/2010 |

OTHER PUBLICATIONS

Holzmann, "The Model Checker Spin", May 1997, IEEE, pp. 1-17.*
Sakai, "Rules and Apriori Algorithm in Non-deterministic Information Systems", 2008, Springer, pp. 1-23.*

* cited by examiner

APPARATUS AND METHOD FOR DETECTING ERROR

CROSS-REFERENCE TO RELATED APPLICATIONS

This application claims the priority benefit of Korean Patent Application No. 10-2012-0080405, filed on Jul. 24, 2012, in the Korean Intellectual Property Office, the disclosure of which is incorporated herein by reference.

BACKGROUND

1. Field

The following description relates to an apparatus and method for detecting an accidental error occurring when an application program is executed in a computer environment using a micro-architecture.

2. Description of the Related Art

With a distribution of personal mobile terminals and an increasing amount of information to be processed, computing devices are becoming more complex, and need to process varied application programs simultaneously. In addition, in response to an increase in a number of applications requiring real-time processing, such as a multimedia, requirements for a system performance of the computing devices have increased. In particular, an application may not be processed effectively using a single processor alone.

To overcome the preceding, a semiconductor integrated technology has been developed and a multi-processor computing technology has been introduced. When compared to a single processor, a multi-processor may have merits in terms of energy efficiency and performance enhancement. However, designing and developing a system using the multi-processor may be difficult, and in particular, verifying a system having simultaneity may be difficult.

Although verification is performed during a development phase of a program, a runtime error may occur while the program is being executed in a real world setting. Here, the runtime error may refer to an error that occurs while an application program is being executed.

SUMMARY

The foregoing and/or other aspects are achieved by providing an apparatus for detecting an error, the apparatus including a measuring unit to measure a deterministic progress index (DPI) and a program counter (PC) value when an instruction is executed, a setting unit to set, as a verification set, a DPI and a PC value measured when the instruction is executed without causing an error, and a detector to set, as a measurement set, the DPI and the PC value measured by the measuring unit, and to detect a runtime error of the instruction by comparing the measurement set to the verification set.

The error detection apparatus may further include a determining unit to determine, based on a predetermined criterion, whether an execution scheme of the instruction corresponds to a deterministic execution scheme having a regular cycle or a nondeterministic execution scheme having an irregular delay cycle, a deterministic progress counter (DPC) to generate the DPI with respect to an instruction that is executed using the deterministic execution scheme, and a PC to generate the PC value indicating a position of an instruction that is being executed on a program.

The detector may detect the runtime error when the DPI and the PC value of the measurement set differ from the DPI and the PC value of the verification set.

The detector may include a real time error detector to detect the runtime error, by comparing the DPI and the PC value of the measurement set to the DPI and the PC value of the verification set, at every clock cycle of a processor.

The detector may include a calculating unit to calculate checksum values of the DPI and the PC value of the measurement set, in a predetermined checksum section, and a section error detector to detect the runtime error, by comparing the checksum values calculated by the calculating unit to checksum values pre-calculated with respect to the DPI and the PC value of the verification set, at an end point of the predetermined checksum section.

The calculating unit may calculate hash values of the DPI and the PC value of the measurement set, sequentially, in the predetermined checksum section, and the section error detector may detect the runtime error, by comparing the hash values calculated by the calculating unit to hash values of the verification set pre-calculated in the predetermined checksum section, at an end point of the predetermined checksum section.

The error detection apparatus may further include a section setting unit to set, to a section for verifying the runtime error, a section in which an execution sequence of the instruction is unchanged depending on input data.

The section setting unit may set, as a checksum section, a section from a point at which the execution sequence of the instruction begins to change to a point at which the change in the execution sequence terminates.

The nondeterministic execution scheme may include a hardware nondeterministic (HWND) execution scheme to execute the instruction using the nondeterministic execution scheme at an instruction level of a hardware-based processor, and a software nondeterministic (SWND) execution scheme to execute a function using the nondeterministic execution scheme at a function level, the function including software-based instructions.

The DPC may increase a value of the DPC based on a system clock when the execution scheme of the instruction is determined to be the deterministic execution scheme.

An operation of the DPC may be controlled based on at least one of an HWND execution signal to execute the instruction using the nondeterministic execution scheme at an instruction level of a hardware-based processor, and an SWND execution signal to execute a function using the nondeterministic execution scheme at a function level, the function including software-based instructions.

The error detection apparatus may further include a control unit to control an SWND execution signal at a function level so that the DPC operates when a thread is in a running state, the function including software-based instructions.

When an interrupt occurs in the running state of the thread, the control unit may set the SWND execution signal to suspend the DPC. When the thread enters the running state after a service routine of the interrupt is terminated, the control unit clears the SWND execution signal to operate the DPC.

The error detection apparatus may further include a memory to store the verification set, and hash values pre-calculated for each predetermined checksum section.

The foregoing and/or other aspects are achieved by providing a method for detecting an error, the method including setting, as a verification set, a DPI and a PC value that are measured when an instruction is executed without causing an error, measuring a DPI and a PC value when the instruction is executed, setting, as a measurement set, the DPI and the PC value measured when the instruction is executed, and comparing the measurement set to the verification set, and detecting a runtime error of the instruction, based on a result of the comparing.

The error detection method may further include determining, based on a predetermined criterion, whether an execution scheme of the instruction corresponds to a deterministic execution scheme having a regular cycle or a nondeterministic execution scheme having an irregular delay cycle, generating, by a DPC, the DPI with respect to an instruction that is executed using the deterministic execution scheme, and generating, by a PC, the PC value indicating a position of an instruction that is being executed on a program.

The detecting may include detecting the runtime error, by comparing the DPI and the PC value of the measurement set to the DPI and the PC value of the verification set, at every clock cycle of a processor.

The detecting may include calculating checksum values of the DPI and the PC value of the measurement set, in a predetermined checksum section, and detecting the runtime error, by comparing the checksum values calculated by the calculating unit to checksum values pre-calculated with respect to the DPI and the PC value of the verification set, at an end point of the predetermined checksum section.

The foregoing and/or other aspects are achieved by providing a non-transitory computer-readable recording medium storing a program to implement the error detection method.

The foregoing and/or other aspects are achieved by providing a method for detecting a runtime error of an instruction, the method including executing, by a processor, the instruction a first time with no errors; measuring at least one of a first deterministic progress index (DPI) and a first program counter (PC) value, as a verification set, when the instruction is executed the first time; executing, by a processor, the instruction a second time; measuring at least one of a second DPI and a second PC value, as a measurement set, when the instruction is executed the second time; comparing the measurement set to the verification set; and detecting the runtime error of the instruction, based on the comparison.

The comparison and the error detection may be performed at each clock cycle of a processor.

The measurement set may be measured and accumulated in a predetermined checksum section, and the comparison and the error detection may be performed at the end of the predetermined checksum section.

The instruction may be executed in a thread of a multi-thread process.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
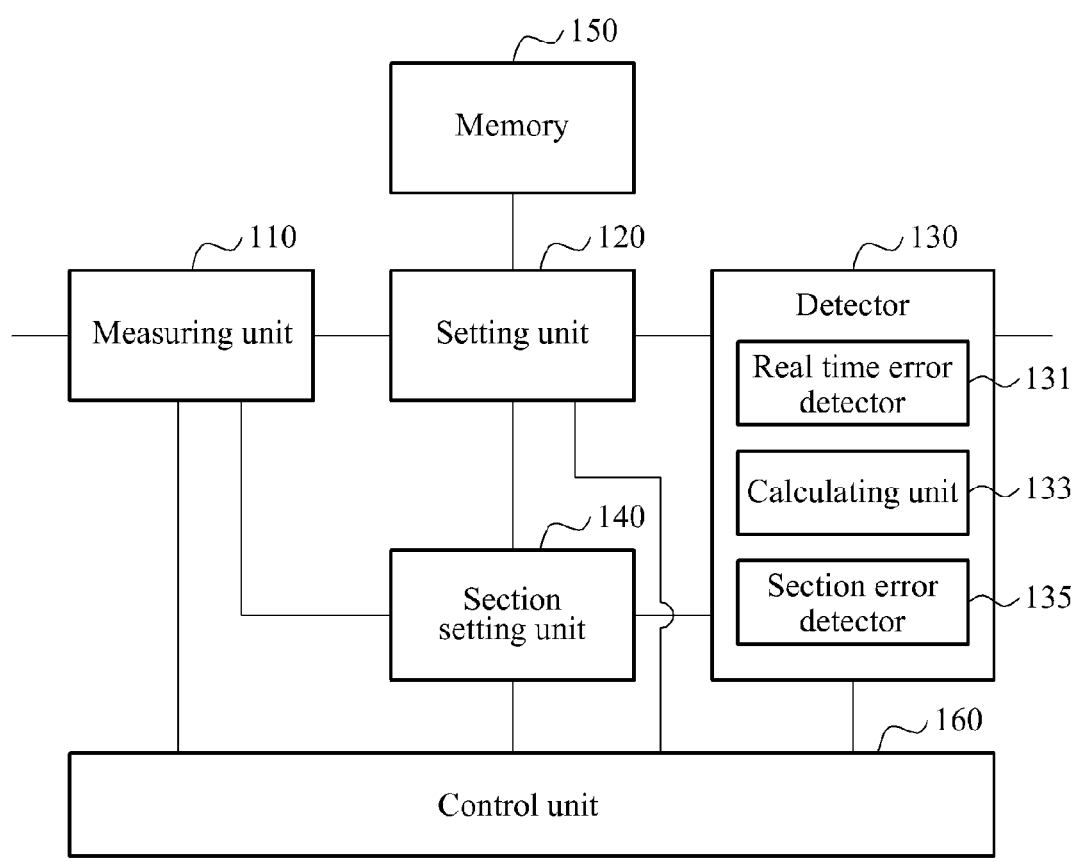
FIG. 1 illustrates an error detection apparatus according to example embodiments.

Reference will now be made in detail to embodiments, examples of which are illustrated in the accompanying drawings, wherein like reference numerals refer to like elements throughout. Embodiments are described below to explain the present disclosure by referring to the figures.

When an accurate performance and progress of an application program being executed is measurable, a measured value may be used for a performance enhancement of a thread, load balancing, and low power management by indexing the measured value. However, it may be difficult to accurately measure a state of the application program while minimizing an occurrence of a runtime error. In addition, instructions constituting an application program may be executed inconsistently. Due to unexpected effects from other application programs executed together with the application program, it may be difficult to measure the state of the application program accurately.

Even though a single application program is executed, a plurality of threads constituting the single application program may be executed simultaneously, which may cause the unexpected effects. Even though the single application program consists of a single thread, instructions constituting the thread may be executed at different time intervals and thus, it may be difficult to measure the state of the application program accurately.

A conventional method of measuring a progress state of an application program may include a method of inserting additional code and a method of using a performance counter. The method of inserting the additional code may be easily implemented. However, due to a runtime overhead resulting from the insertion, it may be difficult to accurately measure the progress state of the application program. The method of using the performance counter may be implemented with relatively low cost. However, because a retired instruction event is used, a clock rate difference may occur between threads. When measuring a highly accurate index by increasing a virtual clock rate, an interrupt overhead of the performance counter may occur, and a performance of the application program may deteriorate. Accordingly, there is a desire for a progress state measurement method that may deterministically measure a progress of an application program, reflect an accurate actual thread progress, and be implemented with relatively small runtime overhead and low cost.

In addition, although an error may not be detected while compiling the application program, an unexpected error may occur due to effects of other application programs while the application program is being executed. Such an error occurring while the application program is being executed may be referred to as a runtime error.

The runtime error may occur when a value is not assigned to a variable, or when an incorrect value is assigned. In general, in a case in which debugging is possible, an application program may be suspended, and an exception helper dialog box may be displayed in a code editor window when a runtime error occurs. That is, when the runtime error occurs, the application program is set to a suspend mode, and debugging may be performed. In this instance, a description about the runtime error and a problem solving tip indicating a cause of the runtime error may be included in the exception helper dialog box.

However, in a situation in which the application is deployed, debugging the runtime error may be difficult, in practice. In addition, when source code to be used for debugging is unavailable, determining whether the actual application program operates normally and detecting an error may be difficult.

With a recent increasing integration of hardware, a computing system operates using an extremely high system clock. However, in the computing system, a soft error may occur frequently due to the increasing integration of hardware. The soft error may refer to an unexpected error occurring due to effects of peripheral hardware.

In addition, an error that does not occur during a static analysis may occur due to instability of a runtime system.

Accordingly, when a performance and progress state of an application is measurable while the application program is being executed, a runtime error may be detected using a measured value, and an execution performance of the application program may be improved.

FIG. 1 illustrates an error detection apparatus according to example embodiments.

Referring to FIG. 1, the error detection apparatus may include a measuring unit 110, a setting unit 120, and a detector 130. In addition, the error detection apparatus may further include a section setting unit 140, a memory 150, and a control unit 160.

The measuring unit 110 may measure a deterministic progress index (DPI) and a program counter (PC) value when an instruction is executed. The DPI may refer to an index indicating a deterministic execution time. The deterministic execution time may refer to a case in which an execution time of an instruction has a regular cycle. The PC value may indicate a position of an instruction being executed on an application program.

Whether each instruction corresponds to a deterministic execution scheme or a nondeterministic execution scheme may be determined based on a predetermined criterion. Here, the predetermined criterion may be defined based on whether an execution time of an instruction has a regular cycle. Accordingly, instructions may be classified by determining whether respective instructions correspond to the deterministic execution scheme or the nondeterministic execution scheme, based on the predetermined criterion. A detailed description as to the preceding will be provided with reference to FIG. 5.

The nondeterministic execution scheme may include a hardware nondeterministic (HWND) execution scheme, and a software nondeterministic (SWND) execution scheme. The HWND execution scheme may refer to a scheme of executing an instruction using the nondeterministic execution scheme at an instruction level of a hardware-based processor. The SWND execution scheme may refer to a scheme of executing a function using the nondeterministic execution scheme at a function level. The function may include software-based instructions.

The measuring unit 110 may measure a DPI and a progress counter value when the instruction is executed without causing an error. A condition under which the instruction is executed without causing an error may be defined as a normal state.

The setting unit 120 may set, as a verification set, the DPI and the PC value measured when the instruction is executed without causing an error. The verification set may include a pair of a DPI and a PC value. The verification set may include a DPI and a PC value measured in the normal state.

The setting unit 120 may set, as a measurement set, the DPI and the PC value measured by the measuring unit 110 when the instruction is executed. The measurement set may include a DPI and a PC value measured at every clock cycle of a processor.

The detector 130 may detect a runtime error of the instruction by comparing the measurement set to the verification set. The detector 130 may set, as a measurement set, the DPI and the PC value measured by the measuring unit 110 when the instruction is executed.

The detector 130 may detect the runtime error when the DPI and the PC value of the measurement set differ from the DPI and the PC value of the verification set.

The detector 130 may include a real time error detector 131, a calculating unit 133, and a section error detector 135.

The real time error detector 131 may detect the runtime error, by comparing the DPI and the PC value of the measurement set to the DPI and the PC value of the verification set, at every clock cycle of a processor. The real time error detector 131 may compare DPIs and PC values of all measurement sets measured at predetermined error verification section to the DPI and the PC value of the verification set, and may estimate that the runtime error occurs when the measurement sets differ from the verification set as a result of the comparing.

The calculating unit 133 may calculate checksum values of a DPI and a PC value of a measurement set, in a predetermined checksum section. The checksum values calculated in the predetermined checksum section may be stored in the memory 150.

The section error detector 135 may detect the runtime error, by comparing the checksum values calculated by the calculating unit 133 to checksum values pre-calculated with respect to the DPI and the PC value of the verification set, at an end of the predetermined checksum section. The checksum values may be accumulated and calculated in the predetermined checksum section. For example, checksum values may be accumulated and calculated from a start point of the predetermined checksum section to an end point of the predetermined checksum section. The checksum values calculated at the end point of the predetermined checksum section may be stored in the memory 150. The section error detector 135 may detect the runtime error by comparing the checksum values calculated at the end point of the predetermined checksum section to stored checksum values calculated in a normal state. When compared to a case of detecting a runtime error at every clock cycle of a processor, detecting a runtime error by comparing only checksum values may be relatively efficient in terms of time, costs, and configuration issues.

The calculating unit 133 may calculate hash values of the DPI and the PC value of the measurement set, sequentially, in the predetermined checksum section. For example, the calculating unit 133 may calculate circular hash values sequentially, from the start point of the predetermined checksum section to the end point of the predetermined checksum section.

The section error detector 135 may detect the runtime error by comparing the hash values calculated by the calculating unit 133 to hash values of the verification set pre-calculated at the predetermined checksum section, at the end point of the predetermined checksum section.

The section setting unit 140 may set, to a section for verifying the runtime error, a section in which an execution sequence of the instruction is unchanged depending on input data. The section in which the execution sequence of the instruction is unchanged may refer to a section in which an execution sequence is undivided, like a conditional statement. For example, with respect to an instruction of a conditional statement, such as an "if" statement, an execution sequence may be divided into true or false depending on input data.

The section setting unit 140 may set, to a checksum section, a section from a point at which the execution sequence of the instruction begins to change to a point at which the change in the execution sequence terminates.

The memory 150 may store the verification set, and checksum values pre-calculated for each predetermined checksum section. For example, the checksum values may include hash values. In addition, the checksum values may include various types of values calculated using a checksum calculating mechanism.

The control unit 160 may control occurrence of an SWND execution signal at a function level so that a deterministic progress counter (DPC) (not shown) operates when a thread is in a running state. Here, the function may include software-based instructions.

When an interrupt occurs in the running state of the thread, the control unit 160 may set the SWND execution signal to suspend the DPC. When the thread enters the running state after a service routine of the interrupt is terminated, the control unit 160 may clear the SWND execution signal to operate the DPC.

The control unit 160 may perform an overall control of the error detection apparatus of FIG. 1, and may also perform functions of the measuring unit 110, the setting unit 120, the detector 130, the section setting unit 140, and the memory 150. In example embodiments of FIG. 1, the configurations have been illustrated separately in order to describe each function separately. However, during actual configuration of a product, all of the configurations may be designed to be processed by the control unit 160, or only a portion of the configurations may be designed to be processed by the control unit 160.

Figure 2:
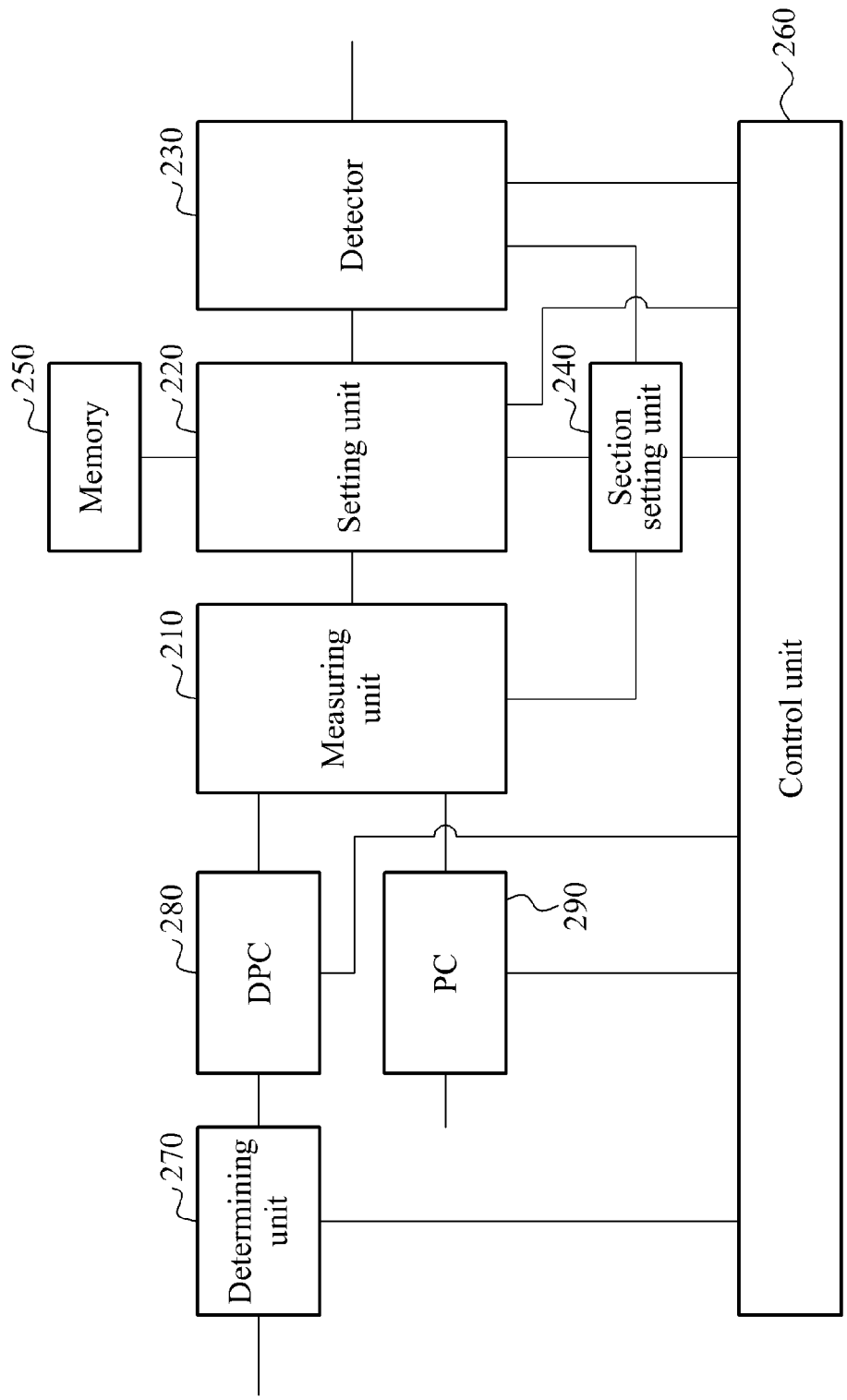
FIG. 2 illustrates an error detection apparatus according to example embodiments.

FIG. 2 illustrates an error detection apparatus according to example embodiments.

Referring to FIG. 2, the error detection apparatus may include a measuring unit 210, a setting unit 220, and a detector 230. In addition, the error detection apparatus may further include a section setting unit 240, a memory 250, a control unit 260, a determining unit 270, a DPC 280, and a PC 290.

The measuring unit 210 may measure a DPI and a PC value when an instruction is executed. The DPI may refer to an index indicating a deterministic execution time. The deterministic execution time may refer to a case in which an execution time of an instruction has a regular cycle. The PC value may indicate a position of an instruction being executed on an application program.

The measuring unit 210 may measure a DPI and a progress counter value when the instruction is executed without causing an error. A condition under which the instruction is executed without causing an error may be defined as a normal state.

The setting unit 220 may set, as a verification set, the DPI and the PC value measured when the instruction is executed without causing an error. The verification set may include a pair of a DPI and a PC value. The verification set may include a DPI and a PC value measured in the normal state.

The setting unit 220 may set, as a measurement set, the DPI and the PC value measured by the measuring unit 210 when the instruction is executed. The measurement set may include a DPI and a PC value measured at every clock cycle of a processor.

The detector 230 may detect a runtime error of the instruction by comparing the measurement set to the verification set. In an another example, the detector 230 may set, as a measurement set, the DPI and the PC value measured by the measuring unit 210 when the instruction is executed.

The detector 230 may detect the runtime error when the DPI and the PC value of the measurement set differ from the DPI and the PC value of the verification set.

The section setting unit 240 may set, to a section for verifying the runtime error, a section in which an execution sequence of the instruction is unchanged depending on input data. The section in which the execution sequence of the instruction is unchanged may refer to a section in which an execution sequence is undivided, like a conditional statement. For example, with respect to an instruction of a conditional statement, such as an "if" statement, an execution sequence may be divided into true or false depending on input data.

The section setting unit 240 may set, to a checksum section, a section from a point at which the execution sequence of the instruction begins to change to a point at which the change in the execution sequence terminates.

The memory 250 may store the verification set, and checksum values pre-calculated for each predetermined checksum section. For example, the checksum values may include hash values. In addition, the checksum values may include various types of values calculated using a checksum calculating mechanism.

The determining unit 270 may determine, based on a predetermined criterion, whether an execution scheme of the instruction corresponds to a deterministic execution scheme having a regular cycle or a nondeterministic execution scheme having an irregular delay cycle. Here, the predetermined criterion may be defined based on whether an execution time of an instruction has a regular cycle. Accordingly, instructions may be classified by determining whether respective instructions correspond to the deterministic execution scheme or the nondeterministic execution scheme, based on the predetermined criterion. A detailed description as to the preceding will be provided with reference to FIG. 5.

The nondeterministic execution scheme may include a hardware nondeterministic (HWND) execution scheme, and a software nondeterministic (SWND) execution scheme. The HWND execution scheme may refer to a scheme of executing an instruction using the nondeterministic execution scheme at an instruction level of a hardware-based processor. The SWND execution scheme may refer to a scheme of executing a function using the nondeterministic execution scheme at a function level. The function may include software-based instructions.

The control unit 260 may control occurrence of an SWND execution signal at a function level so that the DPC 280 operates when a thread is in a running state. Here, the function may include software-based instructions.

The DPC 280 may generate a DPI with respect to an instruction that is executed using the deterministic execution scheme. For example, the DPC 280 may generate the DPI by counting an execution time of the instruction that is executed using the deterministic execution scheme.

The DPC 280 may increase a value of the DPC based on a system clock when the execution scheme of the instruction is determined to be the deterministic execution scheme.

An operation of the DPC 280 may be controlled based on at least one of an HWND execution signal and an SWND execution signal. When at least one of the HWND execution signal and the SWND execution signal is input in the DPC 280, the DPC 280 may suspend the operation. When a set signal is cleared, the DPC 280 may re-operate.

The PC 290 may generate a PC value indicating a position of an instruction that is being executed on a program. For example, the PC 290 may generate the PC value, by matching a clock cycle of a processor to a compiled instruction.

The control unit 260 may perform an overall control of the error detection apparatus of FIG. 2, and may also perform functions of the measuring unit 210, the setting unit 220, the detector 230, the section setting unit 240, the memory 250, the determining unit 270, the DPC 280, and the PC 290. In example embodiments of FIG. 2, the configurations have been illustrated separately in order to describe each function separately. However, during actual configuration of a product, all of the configurations may be designed to be processed by the control unit 260, or only a portion of the configurations may be designed to be processed by the control unit 260.

Figure 3:
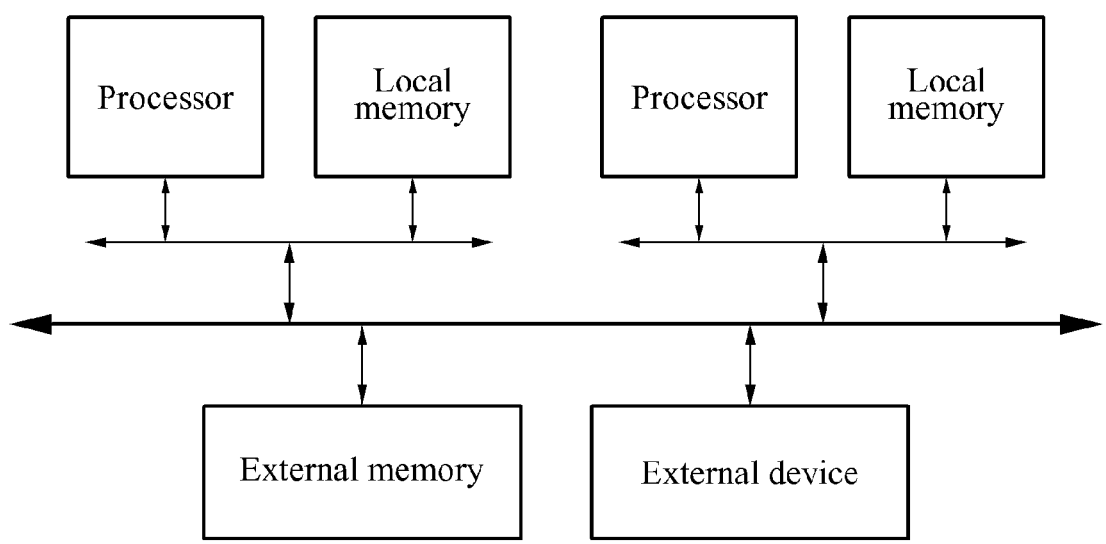
FIG. 3 illustrates a computing environment to which an error detection apparatus is applied according to example embodiments.

FIG. 3 illustrates a computing environment to which an error detection apparatus is applied according to example embodiments.

An application program may perform a predetermined function using a memory and a hardware device as resources on a processor. In general, the memory has a hierarchical structure. In this instance, a local memory having a relatively high access speed may be provided in a local bus, and an external memory having a relatively low access speed, but being relatively inexpensive, may be provided in a system bus. In addition, in order to satisfy a high performance requirement, a multi-processor may perform parallel processing of the application program using a plurality of processors integrated in a single system. Through the system bus and the local bus, the processor may be requested to execute the application program by an external device.

The application program may include at least one thread. Multiple threads may be executed in a single processor. Executing multiple threads in a single processor may be referred to as multi-threading. Accordingly, to measure a performance and a progress state of the application program, a performance and a progress state of the at least one thread constituting the application program may need to be measured. An application environment of an error detection apparatus according to example embodiments is not limited to the example shown in FIG. 3.

Figure 4:
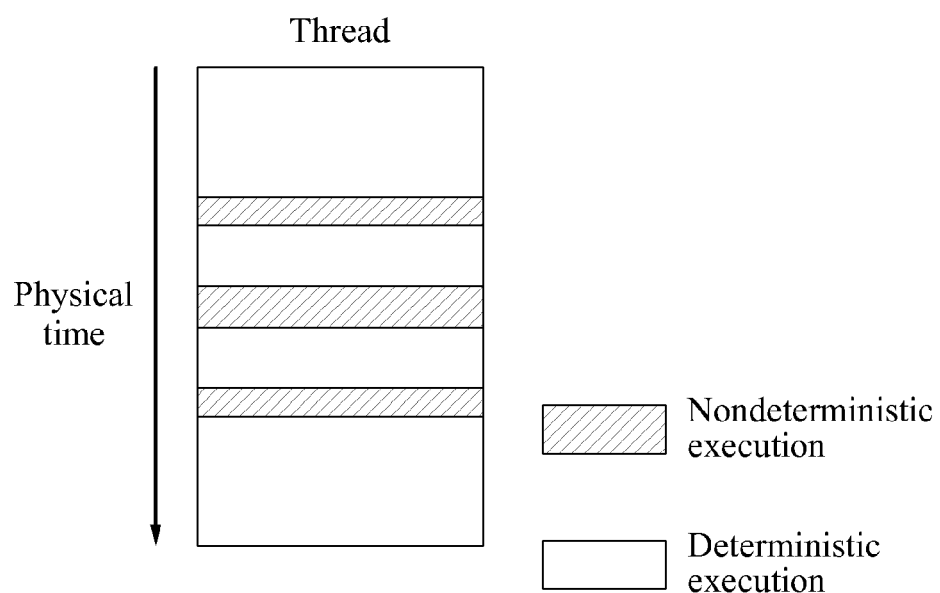
FIG. 4 illustrates an example of an instruction to execute a function of an application program based on a deterministic execution and a nondeterministic execution scheme according to example embodiments.

FIG. 4 illustrates an example of an instruction to execute a function of an application program based on a deterministic execution and a nondeterministic execution scheme according to example embodiments.

A thread constituting an application program may include instructions for executing a predetermined function. The application program may be processed by executing corresponding instructions in a computer. A location of an instruction being executed on the application program may be indicated by a PC value that is counted by a PC. The PC value may be used for debugging the application program.

The PC value may perform a critical role in verifying a progress state of the application program. However, the PC value may be insufficient to detect an error occurring in the application program. When a PC value indicating a position of an instruction for each point is definable while the application program is being executed, a runtime error of the application program may be detected by comparing a PC value measured at a predetermined point to a PC value stored in advance.

Defining a PC value using an absolute value for each cycle of a processor may be difficult because a change in a runtime environment where an application program operates may have an effect on an execution cycle of an instruction.

However, when factors having effects on a change in an execution time are removed from an execution cycle of the instruction, the execution cycle from which the factors are removed may be used as the absolute value that indicates the position of the instruction. Hereinafter, a cycle or an index from which the above factors are removed will be defined as a deterministic progress index (DPI).

An application program may include threads. A thread may include instructions for performing a predetermined function. An execution scheme of an instruction may be classified into a deterministic execution scheme and a nondeterministic execution scheme.

The deterministic execution scheme may refer to a case in which a point in time when an execution of a corresponding instruction is completed, or a point in time when an execution of an instruction group is completed, and may have a regular cycle. Conversely, the nondeterministic execution scheme may refer to a case in which the point in time when the execution of the instruction is completed, or the point in time when the execution of the instruction group is completed, and may have an irregular cycle.

Referring to FIG. 4, a physical time during which each of the threads is executed may consistently increase. In the case of a deterministic execution area, execution of instructions may be completed each time within an identical execution time. Conversely, in the case of a nondeterministic execution area, a completion time may be inconsistent, due to effects from execution of other threads or due to a different circumstance occurring based on an execution point, for example.

Nondeterministic execution may be classified into HWND execution to perform nondeterministic execution at an instruction level of a processor, and SWND execution to perform the nondeterministic execution at a level of an inconsistently occurring event in terms of software, or at a level of a function including instructions.

In a remaining portion excluding the SWND execution and the HWND execution in execution of a thread, an execution time of an instruction can be consistent. Accordingly, a cycle used to execute the remaining portion excluding the SWND execution and the HWND execution may have an identical value at all times. By indexing the remaining portion excluding the SWND execution and the HWND execution, a resulting index may be used as a deterministic execution index of a corresponding thread. That is, an index for a deterministic execution time may indicate an identical position at all times in thread execution. Here, the index indicating the deterministic execution time is referred to as a DPI. The DPI may be expressed by Equations 1 and 2 below.

$$P_{Thread}=P_{DeterministicExecution}+P_{NondeterministicExecution} \quad \text{[Equation 1]}$$

$$T_{DTP}=T_{RunningState}-(T_{SWND}+T_{HWND}) \quad \text{[Equation 2]}$$

Here, a progress $P_{Thread}$ of the thread constituting the application program may be classified into a deterministic progress $P_{DeterministicExecution}$ and a nondeterministic progress $P_{NondeterministicExecution}$. Accordingly, a time $T_{DTP}$ indicating the deterministic progress of the thread may be obtained by subtracting an SWND execution time $T_{SWND}$ and an HWND execution time $T_{HWND}$ from a time $T_{RunningState}$ during which the thread is in a running state.

Figure 5:
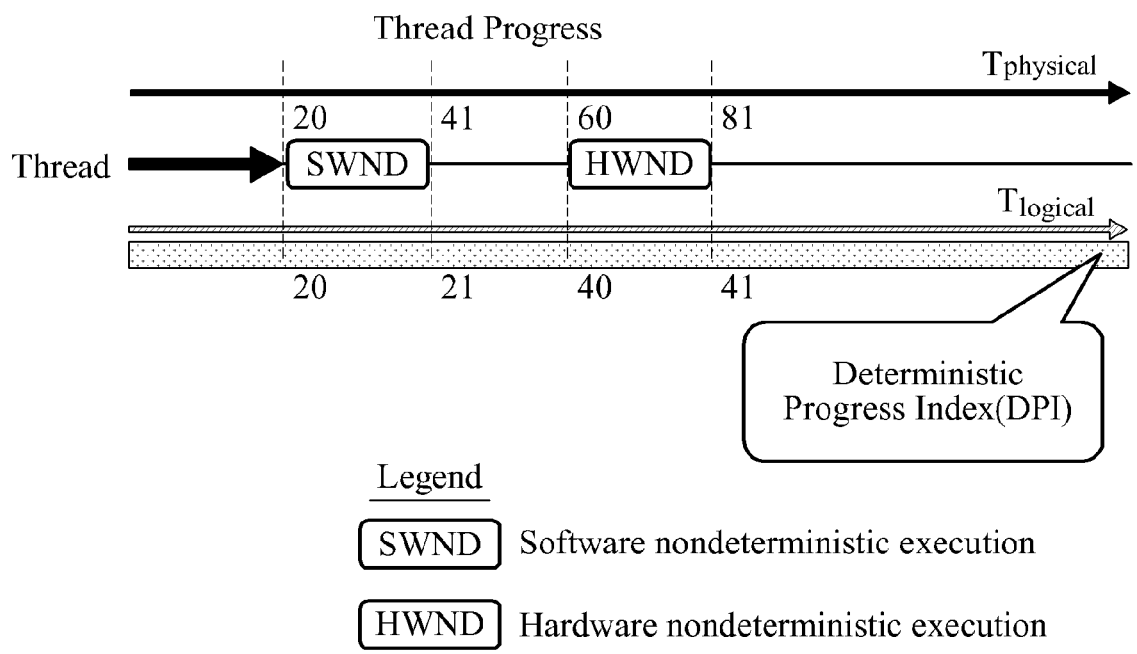
FIG. 5 illustrates a concept of a deterministic progress index (DPI) used in an error detection apparatus according to example embodiments.

FIG. 5 illustrates a concept of a DPI used in an error detection apparatus according to example embodiments.

FIG. 5 illustrates a DPI concept of indexing a logical time excluding an SWND execution and an HWND execution in a thread. While at least one of the SWND execution and the HWND execution is performed, a physical time may increase, whereas the DPI may not increase. When the SWND execution and the HWND execution are terminated, the DPI may increase again. Accordingly, the DPI may be used as a deterministic index indicating a thread execution.

In the thread execution, the SWND execution and the HWND execution may be determined based on a predetermined criterion. The predetermined criterion may be defined based on a case in which an execution time of an instruction or an execution time of a function including instructions measured by a current point in time is consistent, and a case where the execution time is inconsistent. The predetermined criterion is only a definable example of the SWND execution and the HWND execution, however, the criterion is not limited thereto. Instead, it may include a scope that may be readily understood by those skilled in the art. Examples of the SWND execution and the HWND execution are shown in Table 1:

TABLE 1

|  | Type | Example |
| --- | --- | --- |
| SWND | Schedule time | All the states excluding running state. Event or timer wait (EventWait( ), sleep( ), . . . ) |
|  | Interrupt management | Interrupt management instruction Interrupt service routine |
|  | Dynamic resource assignment | Memory assignment/non-assignment Thread generation/termination |
|  | Nondeterministic user function | Busy waiting |
|  | Nondeterministic external device access | Blocked access for nondeterministic hardware device |
|  | Others |  |
| HWND | External memory access | DRAM access |
|  | Cache miss | Instruction/data cache miss |
|  | Branch | Dynamic branch prediction |
|  | Others |  |

Figure 6:
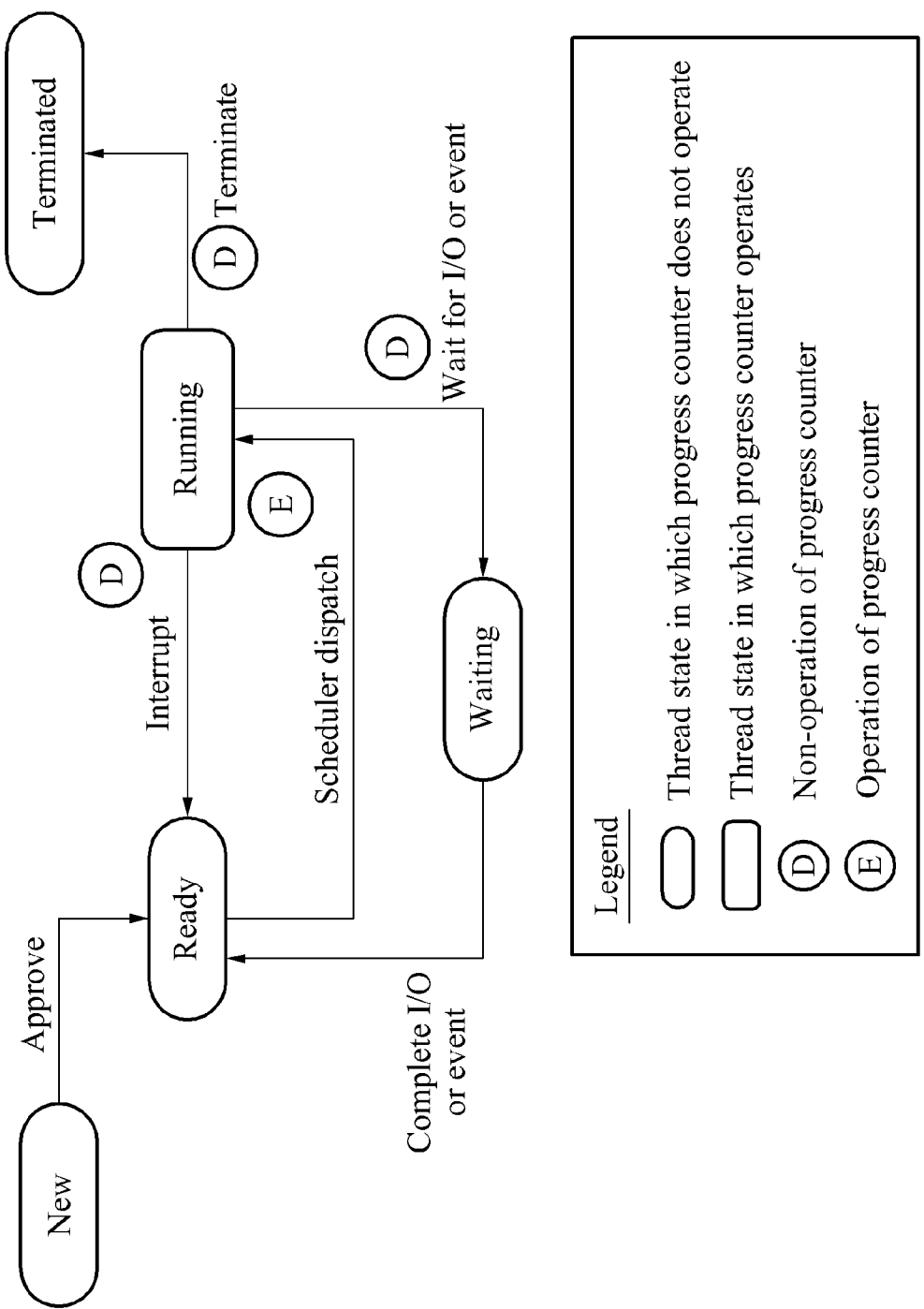
FIG. 6 illustrates an operation of a progress counter based on a change in a state of a thread according to example embodiments.

FIG. 6 illustrates an operation of a progress counter based on a change in a state of a thread according to example embodiments.

An operating system may perform management and scheduling of execution of a plurality of threads so that system resources may be used effectively through the plurality of threads constituting an application program. When a thread is scheduled by the operating system, a state shift may be performed as shown in FIG. 6.

A DPC may operate when the thread is in a running state. For example, when an interrupt occurs while the thread is in the running state, an SWND execution signal may be set so that the DPC may not operate. When the thread enters the running state after a service routine of the interrupt is performed, the SWND execution signal may be cleared to operate the DPC.

That is, the DPC may operate only when the thread is in the running state, thereby generating a DPI.

Figure 7:
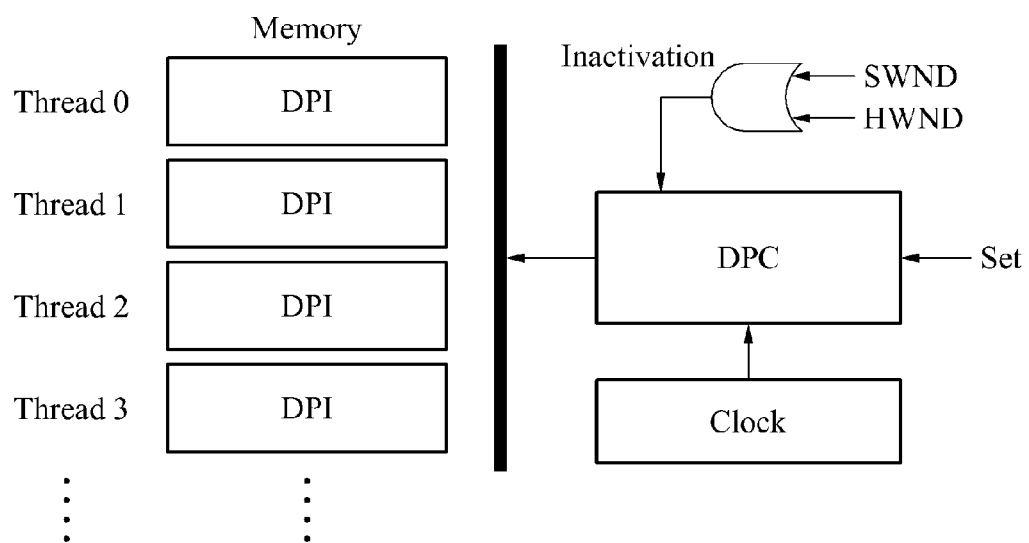
FIG. 7 illustrates a relationship between a deterministic progress counter (DPC) and a DPI for each thread according to example embodiments.

FIG. 7 illustrates a relationship between a DPC and a DPI for each thread according to example embodiments.

Referring to FIG. 7, the DPC may be positioned for each processor, and an activation of the DPC may be determined based on an SWND execution signal and an HWND execution signal. In FIG. 7, an OR logical circuit is configured so that the DPC may be inactivated when the SWND execution signal or the HWND execution signal is set. However, the disclosure is not limited to this configuration. Here, an activation issue of the DPC indicates an operation of the DPC and a non-operation of the DPC. In addition to a scheme of controlling the DPC using the SWND execution signal and the HWND execution signal, the DPC may be controlled using a variety of schemes.

According to example embodiments, an error detection apparatus may include a memory to store a DPI for each thread. The error detection apparatus may copy a current DPC value to a DPI memory of a corresponding thread that is in a running state. That is, the error detection apparatus may copy, as the DPI, a value counted through the DPC. The error detection apparatus may also periodically copy the DPC value to the DPI memory of the corresponding thread being executed.

However, when the DPC value is copied to the DPI memory in real time, a runtime performance may deteriorate. Accordingly, the DPC may indicate a DPI of a thread that is being executed, without copying the DPC value to the DPI memory. At a point in time when context switch is performed from the thread being executed to another thread, a calculated DPC value may be copied to the DPI memory. When the other thread is dispatched, and thereby is shifted to the running state, the error detection apparatus may set, in the DPC, a DPI that is stored in a DPI memory of the other thread, and may enable the DPC to make a count from a DPI that is a previous execution index.

When the context switch is performed to the original thread, the error detection apparatus may load the DPI that is stored in the DPI memory of the original thread, and set the loaded DPI to an initial value of the DPC.

Figure 8:
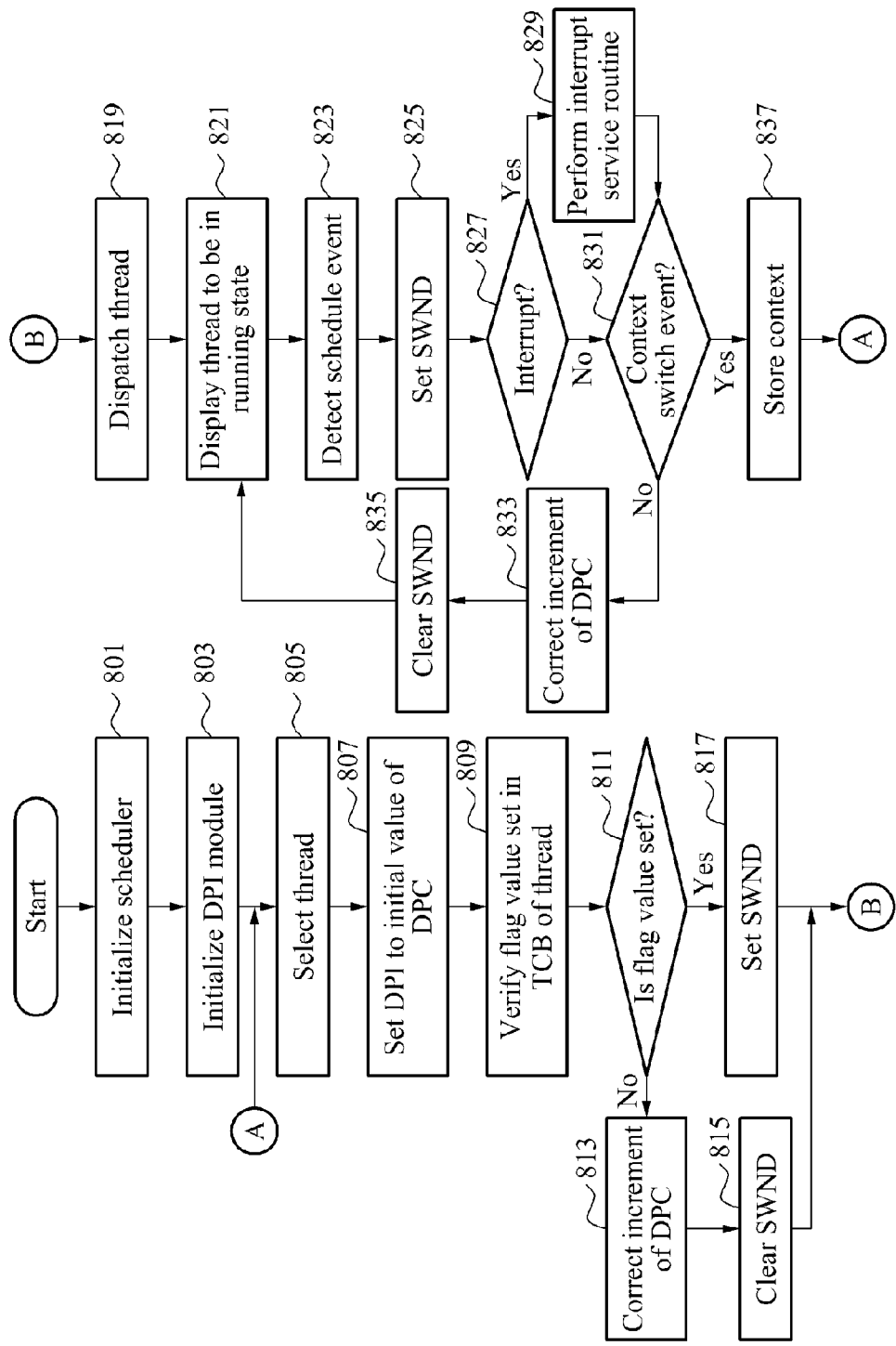
FIG. 8 illustrates an example of performing a scheduler operation using an operating system in an error detection method according to example embodiments.

FIG. 8 illustrates an example of performing a scheduler operation using an operating system in an error detection method according to example embodiments.

An SWND execution signal may occur even when a nondeterministic (ND) function is executed in a running state of a thread. For example, when a dynamic memory assignment system function such as "malloc", for example, is called in a thread, an execution time of "malloc" is inconsistent. Accordingly, an error detection apparatus may need to enable a DPC to not operate in a corresponding section by classifying an SWND execution section until a result is received from a point at which a function "malloc" is called. The function such as "malloc" having an inconsistent execution time is referred to as the ND function.

In operation 801, the error detection apparatus may initialize a scheduler by the OS.

In operation 803, the error detection apparatus may initialize a DPI module. The initialization process may be performed to distinguish a newly executed procedure from an existing procedure being performed.

In operation 805, the error detection apparatus may select a thread prepared based on an instruction to be executed on a scheduler. Because a different instruction to be executed may be assigned for each thread, a thread may be selected based on an execution instruction determined in the scheduler.

In operation 807, the error detection apparatus may set a DPI stored in the thread to an initial value of the DPC. The DPC value may start from "0". However, when a context switch is performed from another thread to an original thread, the error detection apparatus may start a count by setting the DPI stored in a DPI memory to the initial value of the DPC.

In operation 809, the error detection apparatus may determine whether a flag value is set in a thread control block of the thread. The flag value may indicate that the ND function is being executed.

In operation 811, the error detection apparatus may use a flag of the thread control block in order to indicate that the ND function is executed in a running state of the thread. That is, code may be added to a thread control algorithm of a general scheduler so that a DPC value may not increase in an SWND execution section.

In operation 813, when the flag value is not set, the error detection apparatus may correct an increment of the DPC that is unused to execute an instruction of an actual thread effectively.

In operation 815, the error detection apparatus may clear an SWND execution signal to operate the suspended DPC. For each instruction, a DPC cycle to be corrected may be defined, and the error detection apparatus may correct the DPC based on the defined DPC cycle. The DPC cycle may include a cycle used for formal operations, such as setting, clearing, and inactivation, for example. For example, when an execution time used to set the SWND execution signal is four cycles, the four cycles may not have been used to execute an instruction in the thread. Accordingly, a correction may be performed by subtracting four cycles from the DPC value before the SWND execution signal is cleared. Similarly, when the ND function is called, the DPC value may be corrected.

In operation 817, when the flag value of the thread control block is set, the error detection apparatus may set the SWND execution signal in the DPC to suspend the DPC.

In operation 819, the error detection apparatus may dispatch the thread.

In operation 821, the dispatched thread may be in the running state. After the execution of the SWND execution signal is terminated, the DPC may operate, and an instruction requested by the thread may be continuously executed through B.

In operation 823, a schedule event may occur.

In operation 825, when the schedule event occurs in the thread that is in the running state, the error detection apparatus may set the SWND execution signal in the DPC to suspend an operation of the DPC. The schedule event may include, for example, an interrupt, an input/output wait, and an ND function call.

In operation 827, the error detection apparatus may determine whether an interrupt occurs.

In operation 829, when it is determined that the interrupt occurs, the error detection apparatus may perform a service routine of the interrupt, and may set the SWND execution signal in the DPC to suspend an operation of the DPC.

In operation 831, the error detection apparatus may determine whether a context switch event occurs in a state in which the DPC is suspended. In operation 837, when it is determined that the context switch event occurs, the error detection apparatus may store a DPC value of the suspended DPC as a DPI value of the thread before the context switch. In addition, the error detection apparatus may store a context result performed until the context switch occurs.

In operation 833, when the schedule event is terminated in a state in which the operation of the DPC is suspended, the error detection apparatus may correct an increment of the DPC that is unused to execute an instruction of an actual thread effectively. In operation 835, the error detection apparatus may clear the SWND execution signal to operate the suspended DPC.

Also, the error detection apparatus may repeat the above procedure by selecting a thread prepared after the context switch through A.

Figure 9:
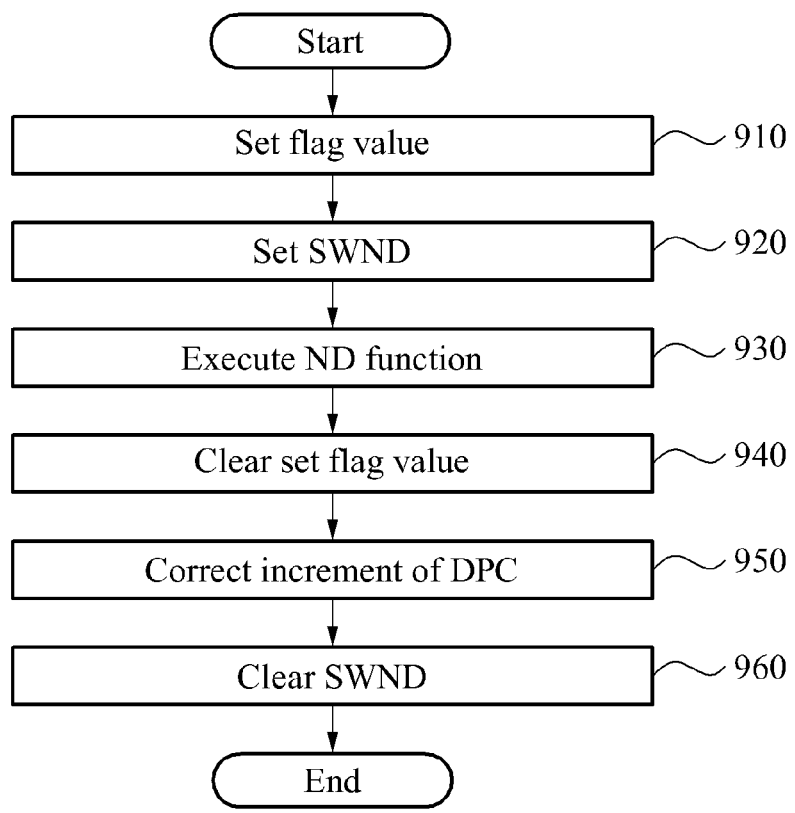
FIG. 9 illustrates an operation of a DPC when a nondeterministic function operates in a running state of a thread, in an error detection method according to example embodiments.

FIG. 9 illustrates an operation of a DPC when a ND function operates in a running state of a thread, in an error detection method according to example embodiments.

In operation 910, an error detection apparatus may set a flag value in a thread control block of a thread. The flag value may indicate that a user function, for example an ND function, is being executed. Examples of generating an SWND execution signal may include an example of generating an SWND execution signal by providing a separate application program interface (API) when the user function is used.

As a typical example, a particular function may be repeatedly performed by "busy waiting". For example, in the case of a function of adding data when an input queue of an external device is empty as a result of verifying whether the input queue is empty, a delay time used for the verification may be nondeterministic depending on a state of the external device. Accordingly, in this case, the error detection apparatus may enable the DPC to not operate in a nondeterministic execution section by providing the separate API. As another example, a pseudo code may show a scheme of processing a busy waiting function. The nondeterministic execution section may be set by providing an API, for example, "DetermSWNDSet( )", "DetermSWNDClear( )", and the like.

```
NonDetermBusyWait(void (*function)(void*), void *Args) {
    SetNDFunctionFlag( );
    SetDPCDisable( );
    function(Args); /* process nondeterministic user function
    ClearNDFunctionFlag( );
    ClearDPCEnable( );
}
DetermSWNDSet(void) {
    SetNDFunctionFlag( );
    SetDPCDisable( );
}
DetermSWNDClear(void) {
    ClearNDFunctionFlag( );
    ClearDPCEnable( );
}
```

In operation 920, when the flag value is set, the error detection apparatus may set the SWND execution signal in the DPC to suspend the DPC.

In operation 930, the error detection apparatus may execute the ND function. For example, the ND function may include the user function.

In operation 940, when the execution of the ND function is completed, the error detection apparatus may clear the set flag value.

In operation 950, the error detection apparatus may correct the increment of the DPC that is unused to execute a code of an actual thread effectively.

In operation 960, the error detection apparatus may clear the SWND execution signal to operate the suspended DPC only in a deterministic execution section in which an execution time is consistent.

Figure 10:
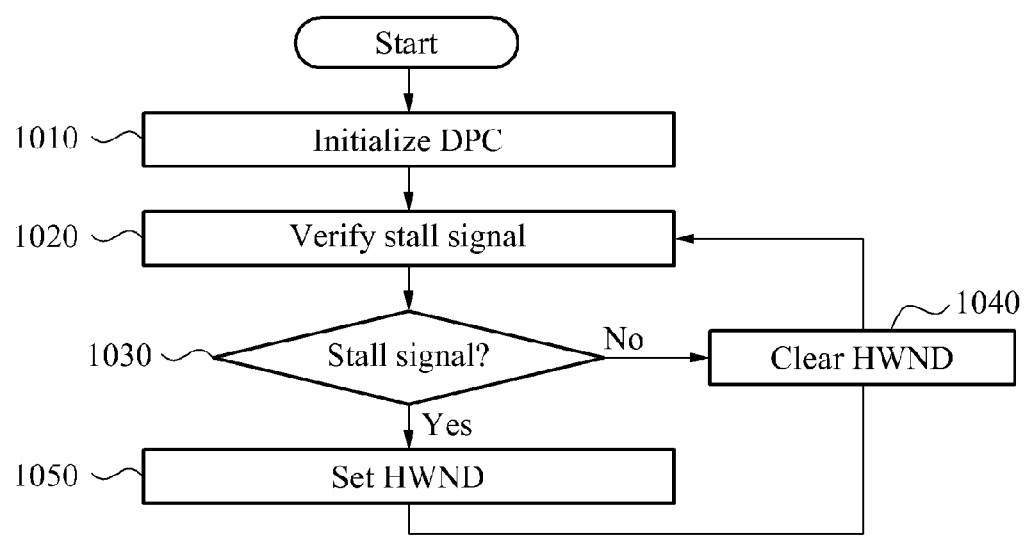
FIG. 10 illustrates an example of generating a hardware nondeterministic (HWND) execution signal in an error detection method according to example embodiments.

FIG. 10 illustrates an example of generating an HWND execution signal in an error detection method according to example embodiments.

In operation 1010, an error detection apparatus may initialize a DPC. Here, the initialization indicates that an instruction execution procedure to be started is shut off from an existing instruction execution procedure.

In operation 1020, the error detection apparatus may verify a stall signal of a processor. When a signal or a state of the processor indicating a nondeterministic execution section of the processor exists in addition to the stall signal, the error detection apparatus may use the signal or the state of the processor as a signal for controlling the DPC.

In operation 1030, the error detection apparatus may determine whether the stall signal is detected. In operation 1050, when the stall signal is detected, the error detection apparatus may set an HWND execution signal to suspend an operation of the DPC.

Conversely, when the stall signal is not detected, the error detection apparatus may clear the HWND execution signal in operation 1040. Accordingly, when the operation of the DPC is suspended, the DPC may re-operate. When the operation of the DPC is not suspended, the DPC may operate continuously.

A bit-width of the DPC may be determined based on the cycle of the processor. When the bit-width of the DPC is significantly narrow, overflow may frequently occur. Accordingly, an update period may need to be significantly reduced. Accordingly, while a power of a system is maintained with the bit-width of the DPC being greater than or equal to 64 bits, for example, an overflow may be prevented and a performance deterioration resulting from an update may be minimized. When an operational clock of the system is less than or equal to approximately 50 megahertz (MHz), for example, a configuration cost may be minimized by decreasing the bit-width to be proportional to the operational clock.

Figure 11:
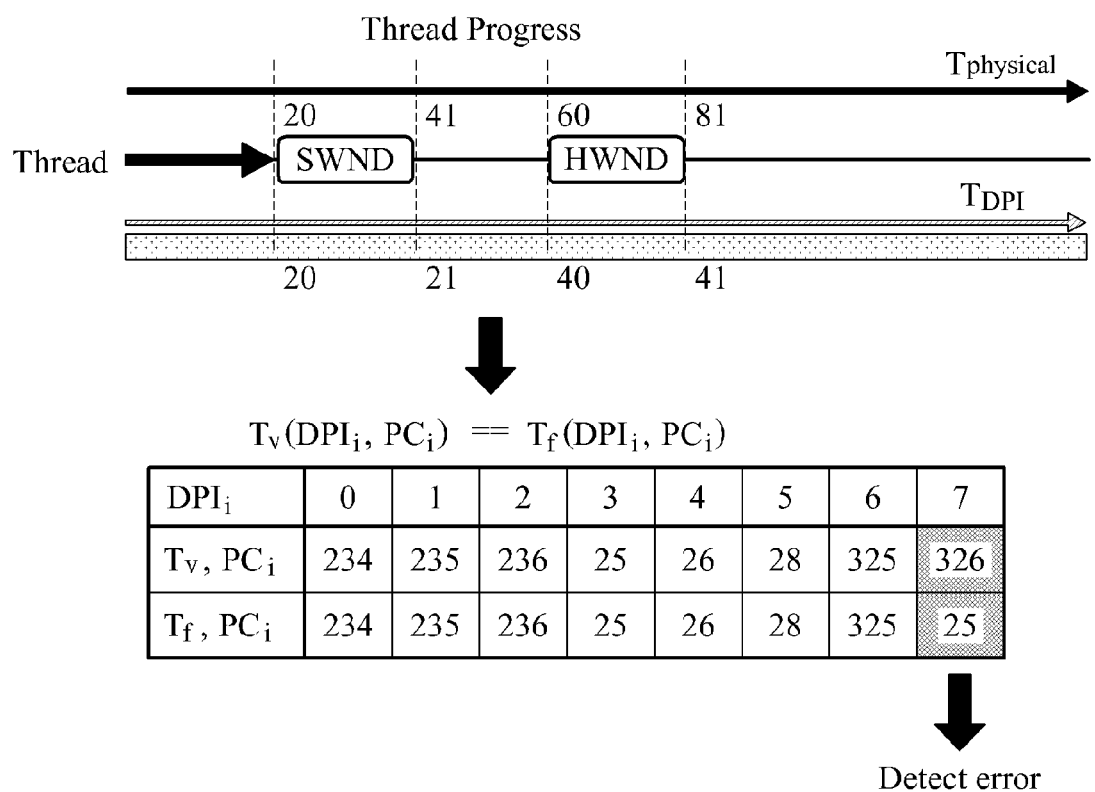
FIG. 11 illustrates a verification set and a measurement set used in an error detection apparatus according to example embodiments.

FIG. 11 illustrates a verification set and a measurement set used in an error detection apparatus according to example embodiments.

Referring to FIG. 11, the error detection apparatus may generate a DPI of a thread. The DPI may be generated during an execution time of an instruction that is executed using a deterministic execution scheme in the thread.

The error detection apparatus may count a PC value when the instruction is executed without causing an error. In addition, the error detection apparatus may count a PC value when the instruction is executed.

The DPI of the thread may match a PC value of the instruction. In FIG. 11, $T_v(DPI_i, PC_i)$ denotes a set of the DPI and the PC value that match each other when the instruction is executed without causing an error, that is, a verification set. $T_f(DPI_i, PC_i)$ denotes a set of the DPI and the PC value that match each other when the instruction is executed, that is, a measurement set.

When a value of the measurement set differs from a value of the verification set, it may be determined that a runtime error has occurred. In particular, when the DPI and the PC value of the measurement set differ from the DPI and the PC value of the verification set, it may be determined that a runtime error has occurred.

Referring to FIG. 11, an instruction is positioned on an identical PC between $DPI_i$ 0 and $DPI_i$ 6. However, at $DPI_i$ 7, $PC_i$ of $T_f$ differs from $PC_i$ of $T_v$. That is, it may be estimated that a runtime error has occurred at a point in time corresponding to $DPI_i$ 7.

Figure 12:
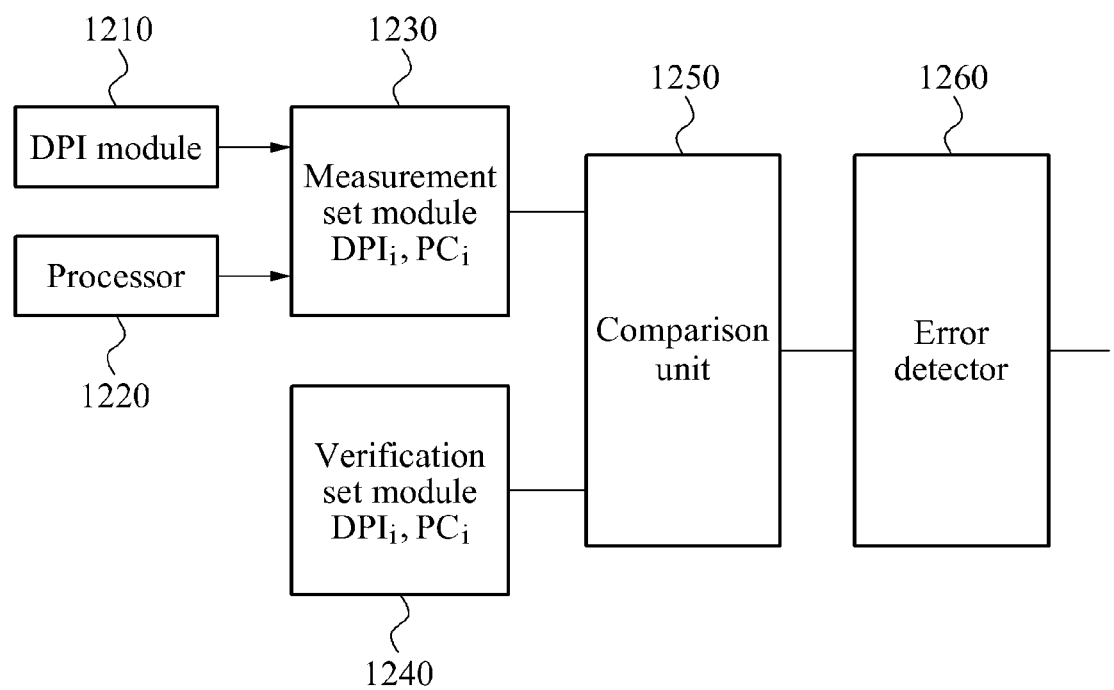
FIG. 12 illustrates an error detection apparatus according to example embodiments.

FIG. 12 illustrates an error detection apparatus according to example embodiments.

Referring to FIG. 12, the error detection apparatus may include a DPI module 1210, a processor 1220, a measurement set module 1230, a verification set module 1240, a comparison unit 1250, and an error detector 1260.

The DPI module 1210 may generate a DPI when an instruction is executed. The processor 1220 may measure a PC value when the instruction is executed. The measurement set module 1230 may match the DPI, for example $DPI_i$, generated by the DPI module 1210 and the PC value, for example $PC_i$, measured by the processor 1220. The DPI and the PC value matching each other may constitute a measurement set.

The verification set module 1240 may store a verification set in which a DPI generated when the instruction is executed without causing an error matches a PC value measured when the instruction is executed without causing an error. The verification set module 1240 may store the verification set in a memory of a system or a storage device similar thereto.

The comparison unit 1250 may compare the measurement set to the verification set. When the measurement set differs from the verification set as a result of the comparison, the error detector 1260 may estimate that an error occurs when the instruction is executed. That is, the error detector 1260 may detect a runtime error.

When the measurement set differs from the verification set, the error detector 1260 may generate an error detecting signal to recognize detection of an error. The error detecting signal may include, for example, an exception signal.

An exception processing routine of the processor 1220 may drive a processing processor corresponding to a detected error. Such a processing routine with respect to a result of the error detection may enable a program to be suspended or restarted, based on importance or effect to a system of the program, for example.

A deterministic property of the DPI may refer to an absolute time used to execute the program. Accordingly, an identical DPI may indicate an identical execution position in the program. The DPI may differ from a PC value, for example, in that, when a loop such as "for", or "while", for example, is executed, the PC value may indicate a position of the instruction on the program, but may fail to indicate a number of times the loop is performed.

However, the DPI may indicate an execution position of the program, and a nondeterministic execution cycle is subtracted from the DPI. Accordingly, at an identical DPI, that a thread is being executed at an identical position may be guaranteed.

When a model for a DPI and a PC value in a normal state is defined, whether an error occurs may be verified by comparing a DPI and a PC value measured at a runtime to the DPI and the PC value defined in advance.

In this instance, an error may be detected by a method of detecting an error by comparing a DPI and a PC value during a runtime execution to a profile value, with respect to all pairs of DPIs and PC values at every clock cycle of a processor, or by a method of detecting an error by comparing circular hash values of a DPI and a PC value measured in a predetermined error verification section to circular hash values with respect to a result of profiling a DPI and a PC value generated with respect to the identical error verification section.

The former method may be referred to as real-time fault detection (RFD), and the latter method may be referred to as delayed fault detection (DFD).

A DPI and a PC value recorded in a situation in which a program is executed normally may be provided as a pair for verification. When an error is absent, PC values at a predetermined DPI may be identical. That is, a PC value $PC_i$ recorded at a predetermined DPI $DPI_i$ may be identical to a PC value $PC_t$ at a DPI $DPI_t$ measured during a runtime execution.

Figure 13:
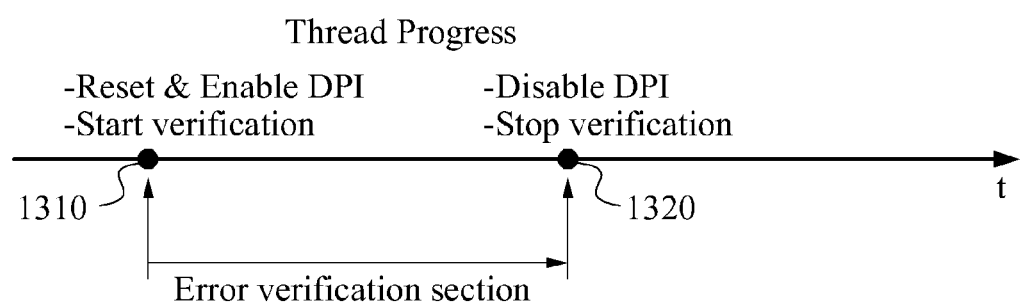
FIG. 13 illustrates a section for verifying an error in real time in an error detection apparatus according to example embodiments.

FIG. 13 illustrates a section for verifying an error in real time in an error detection apparatus according to example embodiments.

A section for which an error may be verified by comparing DPIs and PC values may be determined based on the following conditions. A section in which an execution sequence is changed depending on input data may need to be excluded. That is, a section that may branch off depending on conditions, for example, a conditional statement, may be variable depending on branch conditions. Accordingly, a section may need to be determined to avoid a section in which branching may occur.

The section in which the execution sequence is changed depending on input data may be set so that a compiler may determine a section by avoiding a branch condition, automatically. Also, a pragma, for example, may be used to enable the compiler to recognize the branch condition, manually.

In addition, a DPI and PC value of each branch may be stored with respect to all branches, and values compared based on true and false of branch conditions may be stored separately, thereby using the stored data to detect an error.

Referring to FIG. 13, an error verification section may be started at a point 1310. The error detection apparatus may reset and activate a DPC to generate DPI. The error detection apparatus may detect a runtime error in real time, by comparing PC values with respect to a corresponding DPI at every cycle of a processor, to a point 1320. The error verification section may be terminated at the point 1320.

Figure 14:
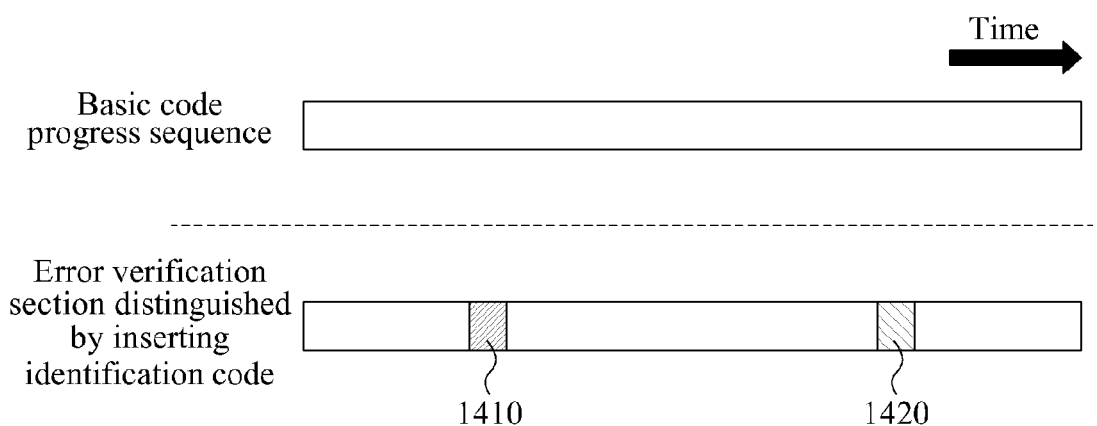
FIG. 14 illustrates a section for verifying an error using checksum values in an error detection apparatus according to example embodiments.

FIG. 14 illustrates a section for verifying an error using checksum values in an error detection apparatus according to example embodiments.

When an extremely large program includes a great number of error verification sections, a memory with enormously high capacity may be required to profile all DPIs and PC values. Accordingly, a method of utilizing the memory efficiently may be applied to a section for which real time error detection is unnecessary.

That is, a checksum section may be determined from the entire program, and circular hash values with respect to DPIs and PC values stored from a start point of the checksum section to an end point of the checksum section may be calculated and stored, rater than storing and comparing all DPIs and PC values with respect to the corresponding checksum section.

The error detection apparatus may calculate circular hash values with respect to a DPI and a PC value measured in a checksum section determined when a program is executed, and may compare the calculated circular hash values to pre-stored circular hash values, at an end point of the corresponding checksum section. When the calculated circular hash values differ from the pre-stored circular hash values as a result of the comparison, the error detection apparatus may detect occurrence of an error. In a scheme of using a checksum section, an error may be detected by use of a memory with an extremely low capacity because hash values of a predetermined length, for example, 128 bits, may be stored for each checksum section, when compared to a method of profiling all DPIs and PC values with respect to a program for which a predetermined degree of margin is permitted in detecting an error.

The error detection apparatus may use a compiler. A checksum section may be set, and a code 1410 indicating a start point of the checksum section may be inserted in a basic code progress sequence. In addition, a code 1420 indicating an end point of the checksum section may be inserted in the basic code progress sequence.

The compiler may recognize the code 1410 and the code 1420, thereby recognizing the checksum section.

When a checksum section is used, a start point and an end point of the checksum section may be set based on a branch condition point with respect to all general codes. The compiler may detect an occurrence of an error by comparing hash values with respect to DPIs and PC values generated in a section that is set irrespective of a result of a branch condition.

Figure 15:
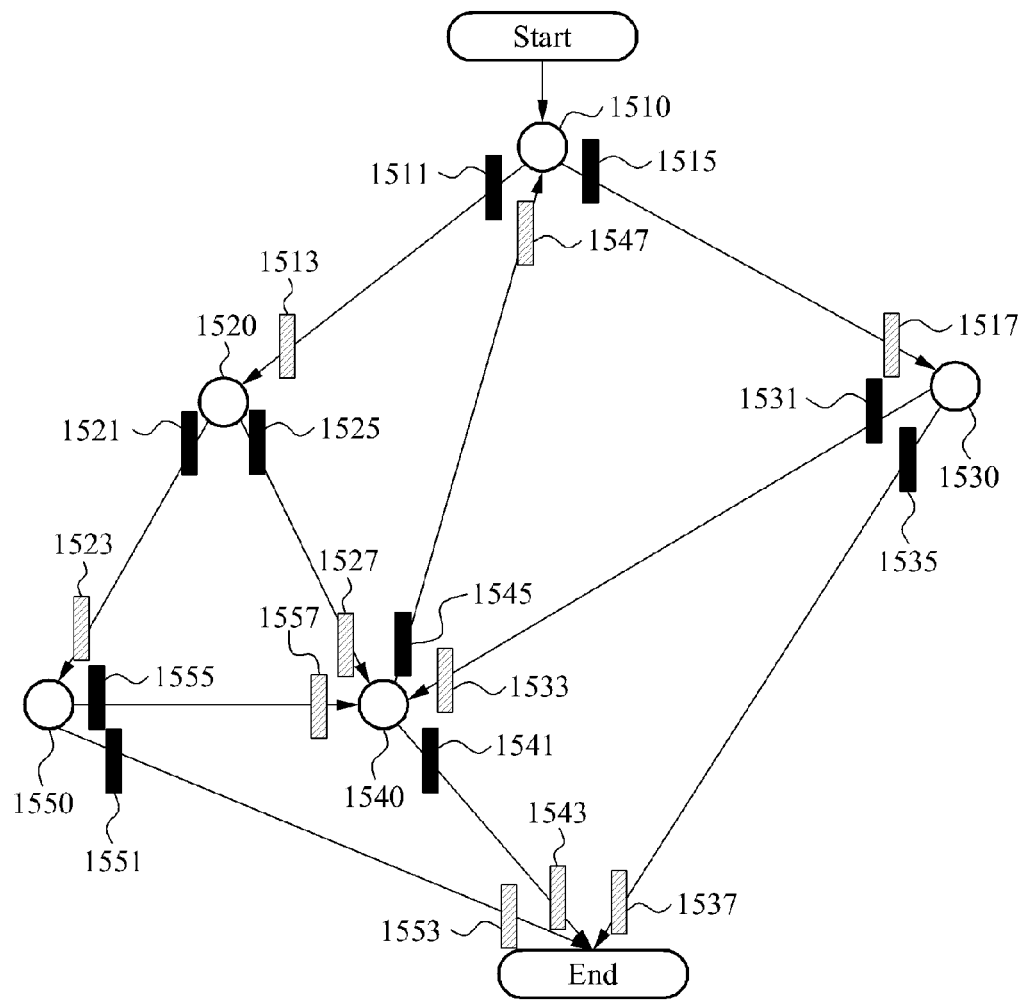
FIG. 15 illustrates a start point and an end point of a checksum section in an error detection apparatus according to example embodiments.

FIG. 15 illustrates a start point and an end point of a checksum section in an error detection apparatus according to example embodiments.

Referring to FIG. 15, a start point 1511 of a first checksum section, a start point 1515 of a second checksum section, and an end point 1547 of a third checksum section may be determined based on a branch point 1510. An end point 1513 of the first checksum section, a start point 1521 of a fourth checksum section, and a start point 1525 of a fifth checksum section may be determined based on a branch point 1520. An end point 1517 of the second checksum section, a start point 1531 of a sixth checksum section, and a start point 1535 of a seventh checksum section may be determined based on a branch point 1530.

An end point 1527 of the fifth checksum section, an end point 1533 of the sixth checksum section, an end point 1557 of an eighth checksum section, a start point 1541 of a ninth checksum section, and a start point 1545 of the third checksum section may be determined based on a branch point 1540. An end point 1523 of the fourth checksum section, a start point 1551 of a tenth checksum section, and a start point 1555 of the eighth checksum section may be determined based on a branch point 1550. An end point 1537 of the seventh checksum section, an end point 1543 of the ninth checksum section, and an end point 1553 of the tenth checksum section may be determined.

A runtime error may be detected by comparing calculated hash values to stored hash values, in each checksum section.

Figure 16:
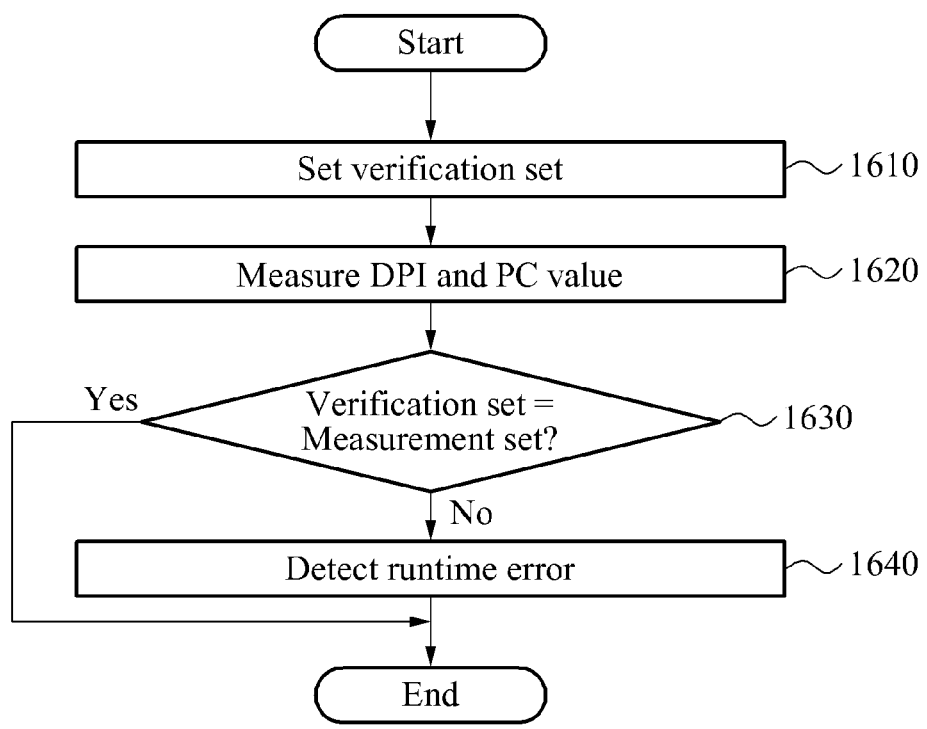
FIG. 16 illustrates an error detection method according to example embodiments.

FIG. 16 illustrates an error detection method according to example embodiments.

In operation 1610, an error detection apparatus may set, as a verification set, a DPI and a PC value measured when an instruction is executed without causing an error.

In operation 1620, the error detection apparatus may measure a DPI and a PC value when the instruction is executed.

In operation 1630, the error detection apparatus may set, as a measurement set, the DPI and the PC value measured when the instruction is executed, and may compare the measurement set to the verification set.

In operation 1640, the error detection apparatus may detect a runtime error of the instruction, based on a result of the comparison.

According to example embodiments, the error detection apparatus may detect a runtime error, by comparing a DPI and a PC value of a measurement set to a DPI and a PC value of a verification set, at every clock cycle of a processor.

According to example embodiments, the error detection apparatus may calculate checksum values of a DPI and a PC value of a measurement set, in a predetermined checksum section.

According to example embodiments, the error detection apparatus may detect a runtime error, by comparing calculated checksum values to checksum values pre-calculated with respect to a DPI and a PC value of a verification set, at an end point of a predetermined checksum section.

According to example embodiments, the error detection apparatus may determine, based on a predetermined criterion, whether an execution scheme of an instruction corresponds to a deterministic execution scheme having a regular cycle or a nondeterministic execution scheme having an irregular delay cycle.

According to example embodiments, the error detection apparatus may generate a DPI with respect to an instruction that is executed using a deterministic execution scheme, through a DPC.

According to example embodiments, the error detection apparatus may generate a PC value indicating a position of an instruction that is being executed on a program, through a PC.

According to example embodiments, the error detection apparatus may accurately detect a runtime error occurring when an application program is executed, based on a verification set and a measurement set, each including a DPI and a PC value.

According to example embodiments, the error detection apparatus may reduce a probability of occurrence of false error detection, using a PC value matching each DPI.

According to example embodiments, the error detection apparatus may use a verification set and a measurement set, each including a DPI and a PC value, without a necessity of inserting separate code to detect a runtime error.

According to example embodiments, the error detection apparatus may use a verification set and a measurement set, each including a DPI and a PC value, to detect an error without a delay, and may handle the error rapidly.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for detecting an error, the apparatus comprising:
   a measuring unit configured to measure a deterministic progress index (DPI) and a program counter (PC) value in response to an instruction being executed;
   a setting unit configured to set, as a verification set, a DPI and a PC value measured in response to the instruction being executed without an error; and
   a detector configured to set, as a measurement set, the DPI and the PC value measured by the measuring unit, and to detect a runtime error of the instruction by comparing the DPI value and the PC value of the measurement set to the DPI value and the PC value of the verification set, at every clock cycle of a processor.

2. The apparatus of claim 1, further comprising:
   a determining unit configured to determine, based on a predetermined criterion, whether an execution scheme of the instruction corresponds to a deterministic execution scheme having a regular cycle or a nondeterministic execution scheme having an irregular delay cycle;
   a deterministic progress counter (DPC) configured to generate the DPI with respect to an instruction that is executed using the deterministic execution scheme; and
   a PC configured to generate the PC value indicating a position of an instruction that is being executed on a program.

3. The apparatus of claim 1, wherein the detector detects the runtime error in response to the DPI and the PC value of the measurement set differing from the DPI and the PC value of the verification set, respectively.

4. The apparatus of claim 1, wherein the detector comprises:
   a real time error detector to detect the runtime error, by comparing the DPI and the PC value of the measurement set to the DPI and the PC value of the verification set, at every clock cycle of a processor.

5. The apparatus of claim 1, wherein the detector comprises:
   a calculating unit configured to calculate checksum values of the DPI and the PC value of the measurement set, in a predetermined checksum section; and
   a section error detector to detect the runtime error, by comparing the checksum values calculated by the calculating unit to checksum values pre-calculated with respect to the DPI and the PC value of the verification set, at an end point of the predetermined checksum section.

6. The apparatus of claim 5, wherein
   the calculating unit calculates hash values of the DPI and the PC value of the measurement set, sequentially, in the predetermined checksum section, and
   the section error detector detects the runtime error, by comparing the hash values calculated by the calculating unit to hash values of the verification set pre-calculated in the predetermined checksum section, at an end point of the predetermined checksum section.

7. The apparatus of claim 1, further comprising:
a section setting unit configured to set, as a section for verifying the runtime error, a section in which an execution sequence of the instruction is unchanged depending on input data.

8. The apparatus of claim 7, wherein the section setting unit sets, as a checksum section, a section from a point at which the execution sequence of the instruction begins to change to a point at which the change in the execution sequence terminates.

9. The apparatus of claim 2, wherein the nondeterministic execution scheme comprises:
a hardware nondeterministic (HWND) execution scheme to execute the instruction using the nondeterministic execution scheme at an instruction level of a hardware-based processor; and
a software nondeterministic (SWND) execution scheme to execute a function using the nondeterministic execution scheme at a function level, the function including software-based instructions.

10. The apparatus of claim 2, wherein the DPC increases a value of the DPC based on a system clock in response to the execution scheme of the instruction being determined to be the deterministic execution scheme.

11. The apparatus of claim 2, wherein an operation of the DPC is controlled based on one of a hardware nondeterministic (HWND) execution signal to execute the instruction using the nondeterministic execution scheme at an instruction level of a hardware-based processor, and a software nondeterministic (SWND) execution signal to execute a function using the nondeterministic execution scheme at a function level, the function including software-based instructions.

12. The apparatus of claim 2, further comprising:
a control unit configured to control a software nondeterministic (SWND) execution signal at a function level so that the DPC operates during a running state of a thread, the function including software-based instructions.

13. The apparatus of claim 12, wherein:
in response to an interrupt occurring in the running state of the thread, the control unit sets the SWND execution signal to suspend the DPC, and
in response to the thread entering the running state in response to a service routine of the interrupt being terminated, the control unit clears the SWND execution signal to operate the DPC.

14. The apparatus of claim 1, further comprising:
a memory to store the verification set, and hash values pre-calculated for each predetermined checksum section.

15. A method for detecting an error, the method comprising:
setting, as a verification set, a deterministic progress index (DPI) and a program counter (PC) value that are measured when an instruction is executed without an error;
measuring a DPI and a PC value when the instruction is executed;
setting, as a measurement set, the DPI and the PC value measured in response to the instruction being executed, and comparing the measurement set to the verification set; and
detecting, by a processor, a runtime error of the instruction, based on a result of the comparing, wherein the detecting comprises detecting the runtime error, by comparing the DPI and the PC value of the measurement set to the DPI and the PC value of the verification set, at every clock cycle of a processor.

16. The method of claim 15, further comprising:
determining, based on a predetermined criterion, whether an execution scheme of the instruction corresponds to a deterministic execution scheme having a regular cycle or a nondeterministic execution scheme having an irregular delay cycle;
generating, by a deterministic progress counter (DPC), the DPI with respect to an instruction that is executed using the deterministic execution scheme; and
generating, by a PC, the PC value indicating a position of an instruction that is being executed on a program.

17. The method of claim 15, wherein the detecting comprises:
calculating checksum values of the DPI and the PC value of the measurement set, in a predetermined checksum section; and
detecting the runtime error, by comparing the checksum values calculated by the calculating unit to checksum values pre-calculated with respect to the DPI and the PC value of the verification set, at an end point of the predetermined checksum section.

18. A non-transitory computer-readable recording medium storing a program to implement the method of claim 15.

19. A method for detecting a runtime error of an instruction, the method comprising:
executing, by a processor, the instruction a first time with no errors;
measuring one of a first deterministic progress index (DPI) and a first program counter (PC) value, as a verification set, in response to the instruction being executed the first time;
executing, by a processor, the instruction a second time;
measuring one of a second DPI and a second PC value, as a measurement set, in response to the instruction being executed the second time;
comparing the measurement set to the verification set; and
detecting the runtime error of the instruction, based on the comparison, wherein the comparison and the error detection is performed at each clock cycle of a processor.

20. The method of claim 19, wherein the measurement set is measured and accumulated in a predetermined checksum section, and the comparison and the error detection is performed at the end of the predetermined checksum section.

21. The method of claim 19, wherein the instruction is executed in a thread of a multi-thread process.

* * * * *